(No Model.)
E. K. DEAN.
AUTOMATIC WATERING DEVICE FOR POT PLANTS.
No. 262,379. Patented Aug. 8, 1882.
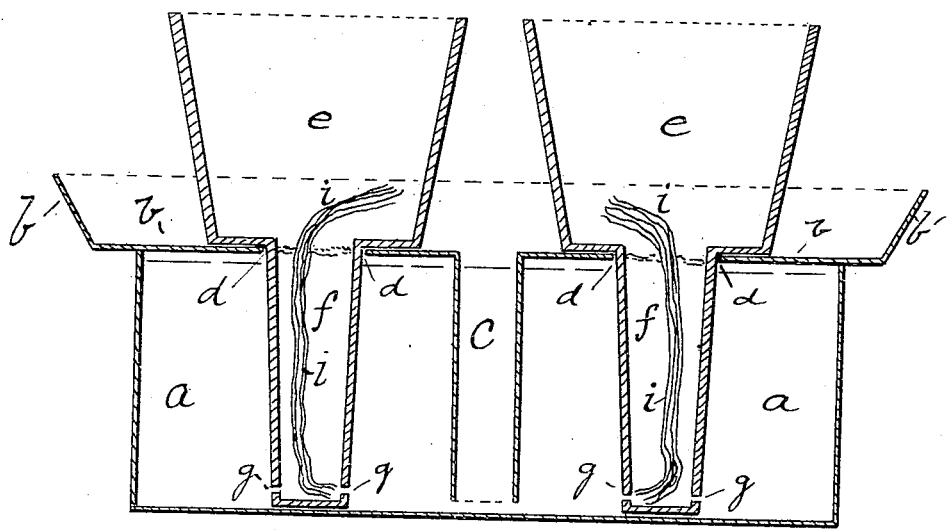

United States Patent Office.

EPHRAIM K. DEAN, OF BANGOR, MAINE.

AUTOMATIC WATERING DEVICE FOR POT-PLANTS.

SPECIFICATION forming part of Letters Patent No. 262,379, dated August 8, 1882.

Application filed May 11, 1882. (No model.)

*To all whom it may concern:*

Be it known that I, EPHRAIM K. DEAN, of Bangor, in the county of Penobscot and State of Maine, have invented certain new and useful Improvements in Automatic Watering Devices for Pot-Plants; and I do hereby declare that the following is a full, clear, and exact description of the invention, that will enable others skilled in the art to which it appertains to make and use the same, reference being had to the accompanying drawing, forming a part of this specification, in which is shown a vertical section of my invention.

Same letters show like parts.

My invention consists of improved devices for keeping pot-plants which are kept out-of-doors automatically supplied with water, which may or may not contain fertilizing elements. It is particularly designed for use in cemeteries to avoid the frequent visitation and care ordinarily necessary.

My invention will be readily understood by reference to the annexed drawing.

At $a$ is shown a reservoir of any convenient form, provided with an air-tight or substantially air-tight cover, $b$, preferably extending beyond its sides, as shown, and having a surrounding rim, $b'$.

At or near the center of the cover is a tube, $c$, flush with its top surface and extending downward nearly to the bottom of the reservoir, and the cover is also perforated with one or more openings, $d\ d$.

The pots $e\ e$, designed to contain the plants, are provided with a downwardly-projecting tube, $f$, preferably tapering from top to bottom, connecting the usual hole in the bottom of the pot, and extending nearly or quite to the bottom of the reservoir, communicating therewith through small openings $g$. This tube $f$ may be of the same or different material than the pot itself.

In use the reservoir $a$ is filled with water containing, if desired, any proper fertilizing material. The tubes $f$, connected with the flower-pots, having been filled with earth well tamped or pressed down, the plants potted, and the reservoir placed in the desired location, the tubes $f$ of the pots are inserted in the holes $d\ d$ of the cover, the bottoms of the pots resting on the cover, as shown, and the tubes communicating through the openings $g$ with the water in the reservoir.

It is evident that, the cover $b$ being substantially air-tight, all the evaporation of the water in the reservoir must take place from the small surface exposed in the tube $c$ and around the tubes $f$, which of course are not expected to fit perfectly, while the large expanse of the rimmed cover $b$ is adapted to collect and conduct to the reservoir all the rainfall during the season, retaining, moreover, for the benefit of the plants all the virtues of the fertilizer used.

Another feature of my invention consists in providing the downwardly-projecting tubes $f$ of the pots with a wick, $i$, passing through the earth therein contained, and composed of any material capable of the necessary capillary attraction and sufficiently durable for the purpose, extending from or near the bottom of said tube to or above the top thereof, the object being that in case any accidental disconnection should take place between the particles of earth in the tube the necessary connection for the supply of water should be provided by the wick.

What I claim as my invention is—

In an automatic watering device for outdoor plants, the combination of the reservoir $a$, having a substantially air-tight cover, $b$, surrounded by a rim, $b'$, for collecting the rainfall, a tube, $c$, for conducting the same to the reservoir and limiting evaporation, one or more openings, $d$, and pots $e$, having downward extensions or tubes $f$, forming a part of said pots and containing a part of the earth of the same, communicating by means of openings $g$ directly with the water in the reservoir, and substantially filling the openings $d$ in the cover $b$, as and for the purposes set forth.

In testimony that I claim the foregoing I have hereunto set my hand this 9th day of May, 1882.

EPHRAIM K. DEAN.

Witnesses:
FREDERICK M. LAUGHTON,
WM. FRANKLIN SEAVEY.